US006976592B1

(12) United States Patent  
Svehaug

(10) Patent No.: US 6,976,592 B1  
(45) Date of Patent: Dec. 20, 2005

(54) LIQUID/SOLIDS WASTE SEPARATOR

(76) Inventor: Henry Svehaug, 114 SW. 5th, Milton-Freewater, OR (US) 97852

( * ) Notice: Subject to any disclaimer, the term of this patent is extended or adjusted under 35 U.S.C. 154(b) by 0 days.

(21) Appl. No.: 10/793,085

(22) Filed: Mar. 4, 2004

(51) Int. Cl.$^7$ .................. B01D 29/01; B01D 29/05; B01D 29/68
(52) U.S. Cl. .................. 210/411; 210/413; 210/499
(58) Field of Search .................. 210/411, 413, 499

(56) References Cited

U.S. PATENT DOCUMENTS

| | | | |
|---|---|---|---|
| 3,357,567 A * | 12/1967 | Wake | 210/408 |
| 3,864,249 A * | 2/1975 | Wallis | 210/785 |
| 4,261,831 A * | 4/1981 | Linsenmeyer | 210/391 |
| 4,412,920 A * | 11/1983 | Bolton et al. | 210/409 |
| 4,437,982 A * | 3/1984 | Wasson | 209/5 |
| 4,468,325 A * | 8/1984 | Yock et al. | 210/408 |
| 4,661,253 A * | 4/1987 | Williams | 210/411 |
| 5,259,955 A * | 11/1993 | Bolton | 210/406 |
| 5,425,876 A * | 6/1995 | Rector | 210/354 |
| 5,462,673 A * | 10/1995 | Piers | 210/739 |
| 5,470,472 A * | 11/1995 | Baird et al. | 210/391 |
| 6,186,340 B1 * | 2/2001 | Hirs | 210/411 |
| 6,354,442 B1 * | 3/2002 | Obst | 210/353 |

* cited by examiner

Primary Examiner—Thomas M. Lithgow  
(74) Attorney, Agent, or Firm—Charles C. Logan, II

(57) ABSTRACT

A liquid/solids waste separator apparatus for use in separating animal waste or waste water into filtered liquid and collected solid waste particles. It has an elongated housing having a pair of support legs attached adjacent to the rear end of the housing for varying the inclination angle of the housing. Positioned downward from the top edge of the housing is an elongated mesh screen that extends substantially the length of the housing. A plurality of nozzles are laterally spaced from each other and connected to the top of a tube that extends transversely beneath the mesh screen. A carriage supports the opposite ends of the tube and it has wheels that ride along tracks supported on opposite lateral sides of the mesh screen. An electric motor drives a chain passing around a pair of sprocket gears in the housing. A drive peg extends laterally from the chain and it is captured by a guide member whose bottom end is connected to the carriage. This allows the carriage to reciprocally travel back and forth beneath the mesh screen and the nozzles produces a water knife spray against the bottom surface of the mesh screen to unclog any apertures in the mesh screen that have become clogged. Part of the filtered liquid is recycled by a pump connected to a fluid line leading to the respective nozzles. Waste particles that do not pass through the mesh screen are collected in containers placed adjacent the front end of the housing.

19 Claims, 3 Drawing Sheets

LIQUID/SOLIDS WASTE SEPARATOR

BACKGROUND OF THE INVENTION

The invention relates to a filtration device and more specifically to a liquid/solids waste separator. The liquid/solids waste separator apparatus has been specifically designed for separating animal waste into filtered liquid and collectable waste particles. The apparatus works especially well for filtering the manure of livestock and hogs by farmers but it could have other applications.

Examples of several prior art patents will be discussed below.

The Hanselmann U.S. Pat. No. 3,607,399 is directed to a method and apparatus for cleaning screen drums in textile machines. In operation, referring to FIGS. 1 and 4, the cleaning roll 10 and drive roll 11 are arranged inside the screen drum 3 with the drive roll 11 to the left of the cleaning roll 10 for a rotation of the screen drum 3 in a counter clockwise direction. The fins 13 on the cleaning roll 10 are inclined in the direction of the screen drum rotation. Upon rotation of screen drum 3, drive roll 11 rotates in the same direction due to the friction of its rubber surface on the interior surface of screens 5. Drive roll 11, due to its frictional contact with the fins 13 on the cleaning roll 10, drives the cleaning roll 10 in a opposite clockwise direction. A carrier air stream then transports the fiber material 1 via the feed duct 2 to the outer surface of screen 5 of the rotating screen drum 3. The air stream then flows through the perforations 4 into the interior space of screen drum 3 while the fiber material is deposited on the outer surface of screen 5. At the same time, the fins of the rotating cleaning rolls remove any tangles that form in the perforations 4 or at other places on the interior surface of the screen. The fiber material removed after passing a line of frictional contact between the drive roll and cleaning roll is then carried away from the inside by the carrier air stream which passes through screen 5 and exits via an exhaust duct (not shown) at the uncovered end of the screen drum. An alternative embodiment uses a plurality of balls to replace the cleaning roll and the drive roll.

The Black et al U.S. Pat. No. 3,656,493 is directed to a screen washing apparatus with an enclosure cabinet having screen loading means extending between the exterior and the interior of the cabinet. The cabinet contains a washing gun support means advanceable across the area of the screen by controlled bi-directional movement to interrelated conveyance means, one in one dimension and one in the other dimension transversely thereto, the one having a sweeping movement and the other an incremental advancement. Lighting means is arranged to allow visual inspection upon completion of the washing cycle, through access doors. The washing gun is removable from its support means for manual washing of any local areas.

The Mikolajczyk U.S. Pat. No. 3,855,118 is directed to a device for washing and retaining representative drilled formation cuttings such as customarily obtained for analysis in oil field drilling operations. The washing device is used in the following manner. The lid 17 is raised and the cage door 27 is slid to the left out of position. The operator thereupon places the well cutting samples to be washed within the foraminous cage assembly 20, closing the various access doors to initiate washing. The water control valve 36 is then opened as well as the drain valve 26, and the screen assembly 20 rotates by virtue of a hand crank assembly 40 during which time the well cutting samples are continually agitated and tumbled within the cage assembly 20. The perforations 25 within the oblong tube members 24 are preferably positioned such that the resulting stream is directed at the well cutting samples. Screen 20 and access door 27, together with its related appurtenances, is fabricated of brass or bronze.

The DeLoach U.S. Pat. No. 4,682,613 is directed to apparatus for cleaning loose fill media, and more particularly to apparatus for cleaning loose fill media of the type used in aeration, de-gassification, odor control and air stripping towers. It has a foraminated cylindrical container mounted on a platform for rotation at a relatively slow speed. A portion of the container passes through a pan containing a liquid solvent of the particular type useful in removing the containment which has filed the medium. A first pump is provided to transfer this liquid from the pan to a storage tank. A second pump delivers liquid at high pressure to be sprayed on the media. A hoist raises one end of the container to facilitate the unloading of the cleaned media.

The Rohm et al U.S. Pat. No. 4,705,055 is directed to apparatus for automatically cleaning extrusion screens in juice finishing machines and the like. The automatic cleaning apparatus 50 includes a cleaning assembly or wash ring 52 comprising a tubular horseshoe-portion 54 extending generally circumferentially about the cylindrical screen 14 in the region between screen 14 and housing 12. Cleaning assembly 52 is also provided with a plurality of nozzles 56 which are supplied with cleaning fluid from the tubular horseshoe-shaped portion 54. Cleaning assembly or wash ring 52 is supported about the periphery of a cylindrical screen by mounting brackets 62 and 64. Brackets 62 and 64 are in turn slidably mounted on V-shaped tracks 66 and 68 so that the entire cleaning assembly or wash ring 52 is capable of reciprocating lateral movement with respect to cylindrical screen 14.

The MacFarlane U.S. Pat. No. 5,400,812 relates to apparatus and a method of cleaning textile printing screens. Cleaning apparatus 10 comprises pump house 11, an enclosed wash tank 12 and a loading unit 13, supported on the framework. The pump house is arranged to deliver high pressure water to an internal screen cleaning nozzle arrangement 14 and a ring-shaped external screen cleaning nozzle 15. The nozzle arrangements 14, 15 are arranged in a gap 19 between a screen support skid 16 and an entry screen support skid 17. The screen support skid 16, the entry screen support skid 17 and loading skid 18 include a semi-circular recess substantially the same diameter as that of a cylindrical printing screen to be cleaned. Skids 16,17 and 18 are thereby arranged to support the cylindrical printing screen during passage into and from the apparatus 10.

The Lithander U.S. Pat. No. 5,549,759 is directed to a tube or pipe cleaning apparatus in which a rotatable conveyor drum is mounted within a container. The drum periphery is formed with pipe-receiving pockets, where a high pressure solution is simultaneously sprayed over and within the pipes to clean them.

The Cord et al U.S. Pat. No. 5,769,956 is directed a screen cleaning apparatus that includes an enclosed housing which forms a cleaning chamber having a plurality of spraying nozzles positioned therein to spray a printing screen with a cleaning solvent. An oscillating mechanism is mounted within the cleaning chamber to move the screen in an oscillating motion in front of the spray nozzle to provide an efficient and effective cleaning of the printing screen.

The Nanjyo et al U.S. Pat. No. 5,860,361 is directed to a screen plate cleaning station having nozzles discharging a cleaning liquid to clean a screen plate which has been set in place, the station comprising a hood-like cleaning zone setting means which are provided on both sides of the screen plate in such a manner that their extremities are in contact with both surfaces of the screen plate, thereby defining substantially equal cleaning zones on both sides to prevent the cleaning liquid discharge from the nozzles from scattering.

The Foster et al U.S. Pat. No. 6,129,099 is directed to a pallet washing apparatus and method. The apparatus includes a main housing having a conveyor system on which articles are transported into and through a washing chamber. A plurality of high pressure, jet-stream spray nozzles rotating at high speeds are supplied with a high pressure wash fluid. The spray nozzles provide rapid powerful, knife-like jet streams of wash fluid which impact the surface of the articles moving through the washing chamber repeatedly to lift and blast off contaminants adhered to the articles.

The Cord et al U.S. Pat. No. 6,174,382 B1 is directed to a printing screen cleaning and reclaiming apparatus comprising a cleaning device defining a cleaning and reclaiming path and a plurality of low pressure-high volume water wash off stations, in series, along the path. An ink degradient, an emulsion remover, and a degreaser are each applied successively along the path, and an ink removal station, an emulsion removal station, and a degreaser removal station are positioned successively along the path to provide the low pressure-high volume water wash off.

The Tani U.S. Pat. No. 6,234,080 B1 is directed to apparatus for cleaning screens used in screen printing machines for printing of solder paste onto a surface of a printed circuit board.

It is an object of the invention to provide a novel liquid/solids waste separator having an elongated mesh screen to filter solids from liquids that have already passed through one or more separators.

It is also an object of the invention to provide a novel liquid/solids waste separator apparatus for filtering cattle and hog waste effluent.

It is another object of the invention to provide a novel liquid/solids waste separator apparatus that self cleans its filtering screen thereby reducing or eliminating downtime normally required to clean the screen.

It is an additional object of the invention to provide a novel liquid/solids waste separator apparatus that recycles filtered liquid to be used by the high pressure spray nozzles used to blast solid waste particles off the filtration screens thereby elimination the need for a separate water source.

It is also an object of the invention to provide a novel liquid/solids waste separator having an elongated stainless steel screen whose openings can be kept clear by high pressure waste without abrasive wear on the screen.

It is another object of the invention to provide a novel liquid/solids waste separator mounted in an adjustable frame so that the angle of the separator housing can be varied to control flow of the effluent over the separator elongated screen.

It is a further object of the invention to provide a novel liquid/solids waste separator that has full time cleansing that is accomplished by a traveling spray bar under the screen going parallel to the screen at a regular rate.

SUMMARY OF THE INVENTION

The liquid/solids waste separator is used to separate solid waste particles from farm animal effluent or industrial processing of waste water. Prior to passing the effluent through the novel liquid/solids waste separator, the effluent has been passed through one or more separators. The separator utilizes a fine mesh screen and it has been designed so that it can operate continuously without the necessity of closing down or stopping the operation of the system in order to clean particles out of the mesh.

The liquid/solids waste separator has an elongated housing having a front wall, a rear wall, a left side wall, a right side wall and a bottom wall. There is an inner left side wall and an inner right side wall that are laterally separated from each other and they have their front and rear ends secured to the respective front and rear walls. A 200 mesh or larger stainless screen has its lateral edges secured by clamps to the inside of the respective inner side walls. The afore mentioned structure provides a flow channel for effluent to pass there over. The separator has support legs for positioning the housing so that its rear end is higher than its front end. The support legs may be adjusted with respect to the housing at different heights to vary the angle of inclination with the horizontal and the angle is in the range of 25–60 degrees. The angle range of 35–38 degrees appears to be optimal.

An effluent overflow tank is mounted adjacent the rear end of the housing and it has a spreader box pan that directs the overflow from the tank to the top end of the screen where it is evenly deposited thereon. The effluent travels downwardly over the top surface of the screen with liquid passing through the screen's apertures to a filtered liquid collection chamber in the bottom of the housing. Solid waste particles travel downwardly over the top surface of the screen and some of them become trapped in the apertures of the screen. A continuously traveling spray assembly is positioned below the screen. It has a carriage having wheels thereon that travel on tracks extending from the outer surface of the inner left and right side walls. The carriage has a guide member that captures a drive peg that is rigidly secured to a closed loop chain. The chain is driven continuously around a pair of longitudinally spaced sprocket gears driven by an electric motor. As the drive peg passes around the respective sprocket gears, it is either rising or falling in the slot of the guide member so that its travel is continuous. Full time cleaning of the screen is accomplished by the traveling spray assembly under the screen that is moving at a timed rate. The timing can be adjusted. The effect is that on the uphill travel of the spray assembly, the underneath spray frees any particles caught in the apertures of the screen. On the downhill travel of the spray assembly the freed particles are flooded downwardly off the bottom end of the screen.

The liquid passing through the apertures of the screen is so clear that a portion of it can be utilized to be pumped through the nozzles of the spray bar without clogging the nozzles. The cleaning of the screen is thus constant using the clean water that has been recovered. The apparatus is very simple and should have a long life since there is no vibration to it. The apparatus reduces the present load on our waste processing systems.

An added benefit of the separator is that the filtered liquid that has been collected can be profitably sold as fertilizer for trees, shrubs, etc.

DESCRIPTION OF THE PREFERRED EMBODIMENT

Figure 1:
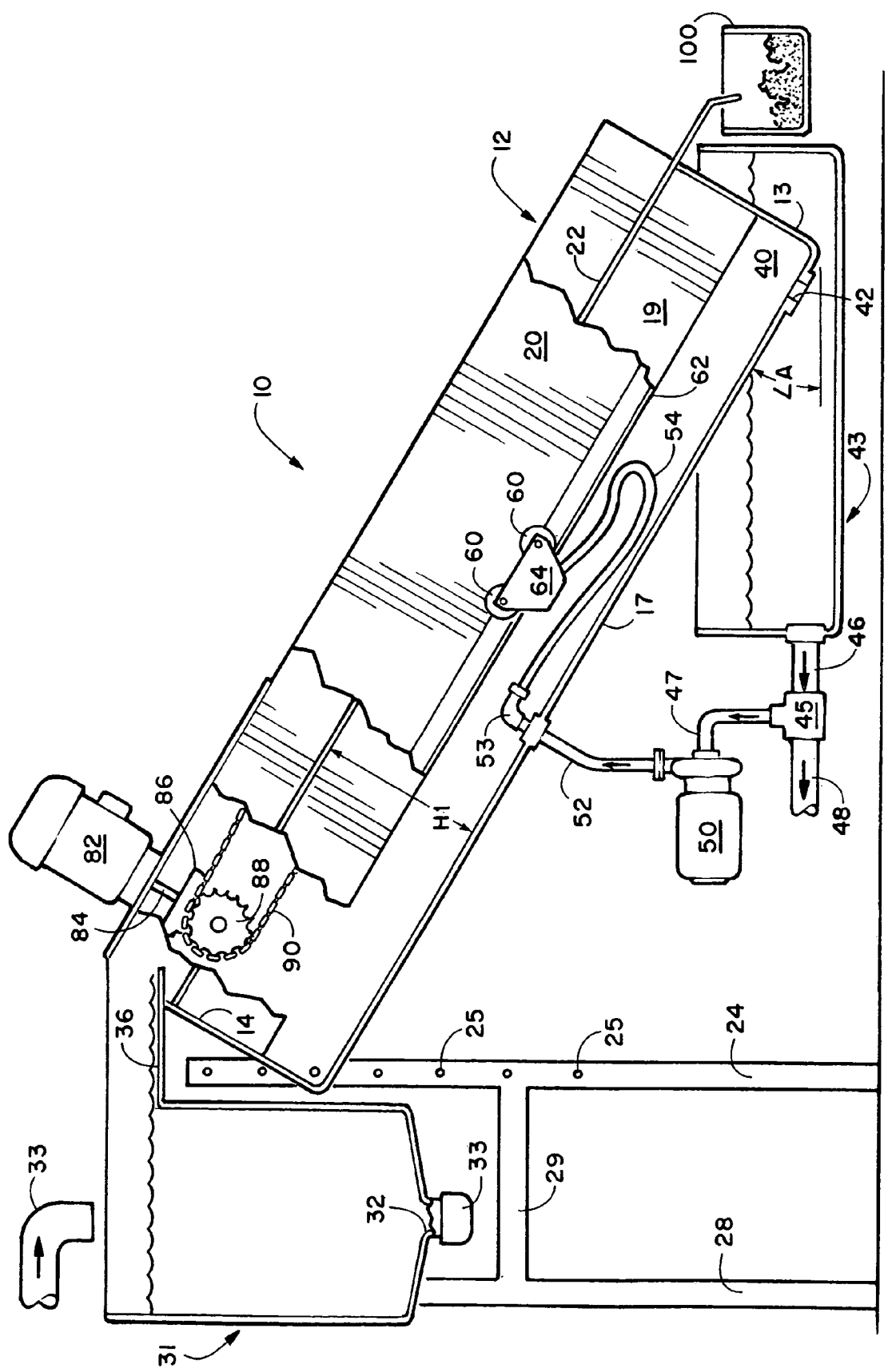
FIG. 1 is a schematic side elevation view taken along lines 1—1 of FIG. 2 and it additionally illustrates an effluent overflow tank.
Figure 2:
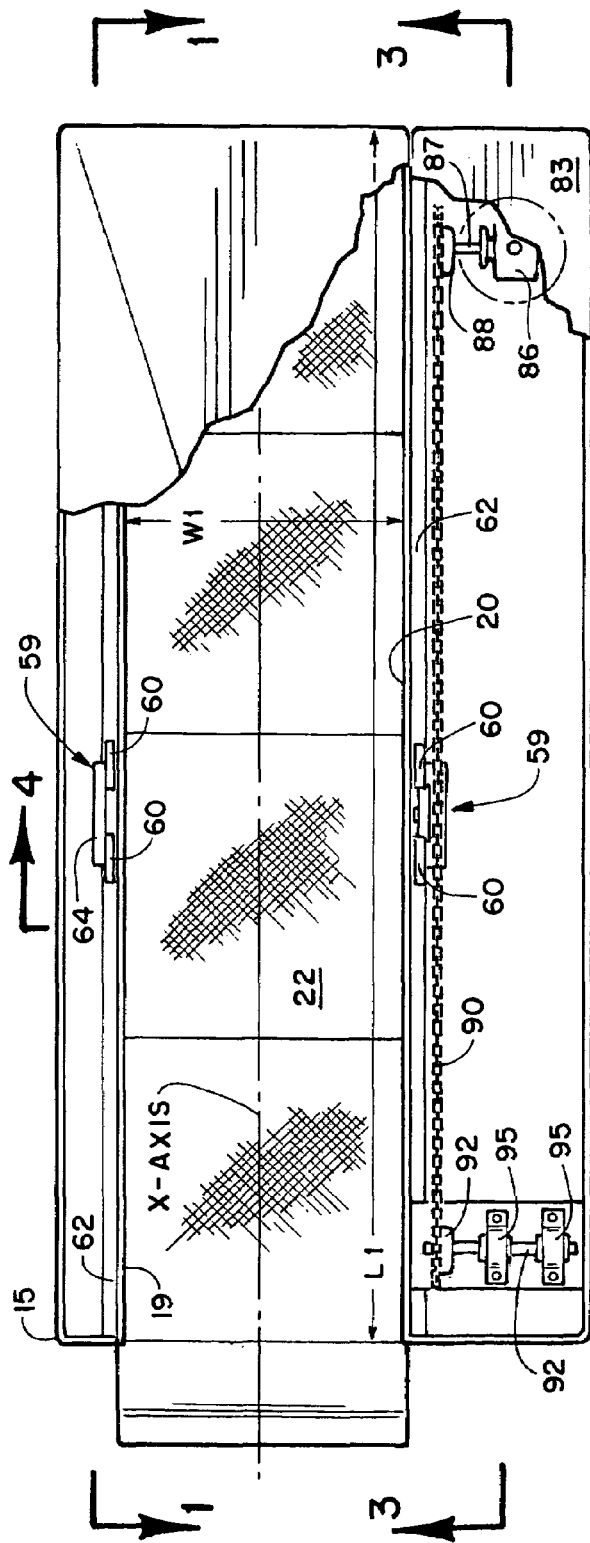
FIG. 2 is a top plan view of the liquid/solids waste separator with portions broken away.
Figure 3:
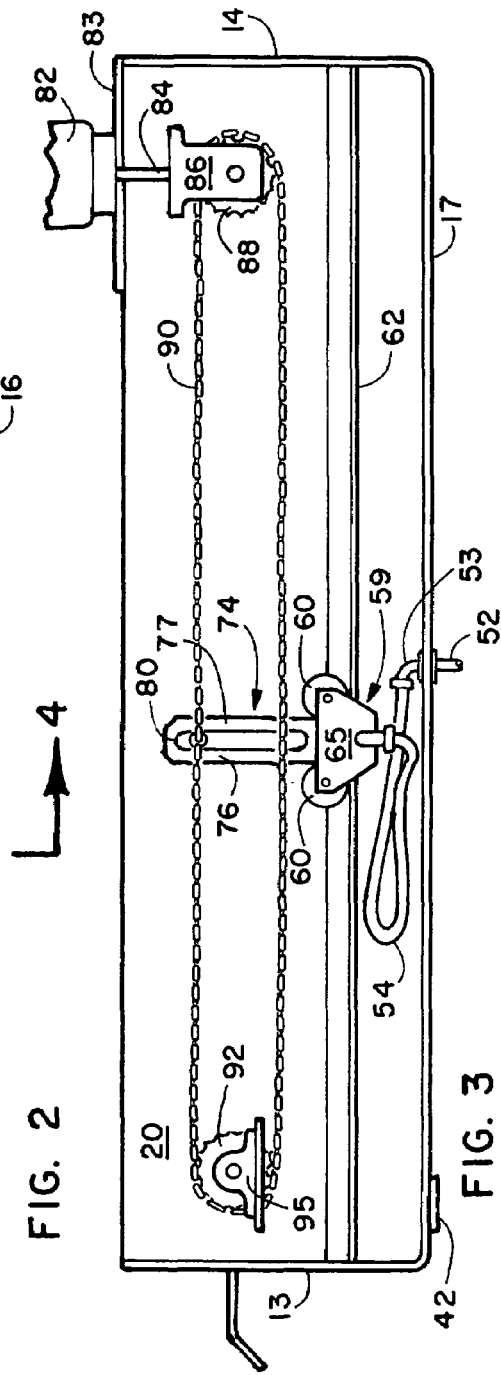
FIG. 3 is a schematic side elevation view taken along lines 3—3 of FIG. 2.
Figure 4:
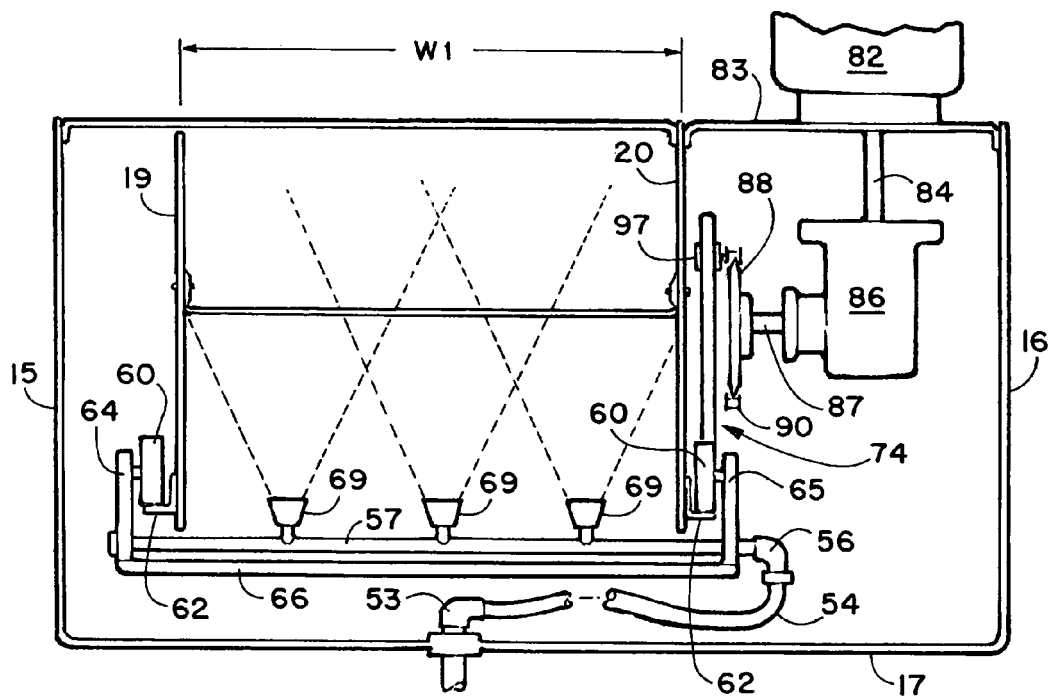
FIG. 4 is a schematic cross sectional view taken along lines 4—4 of FIG. 2.
Figure 5:
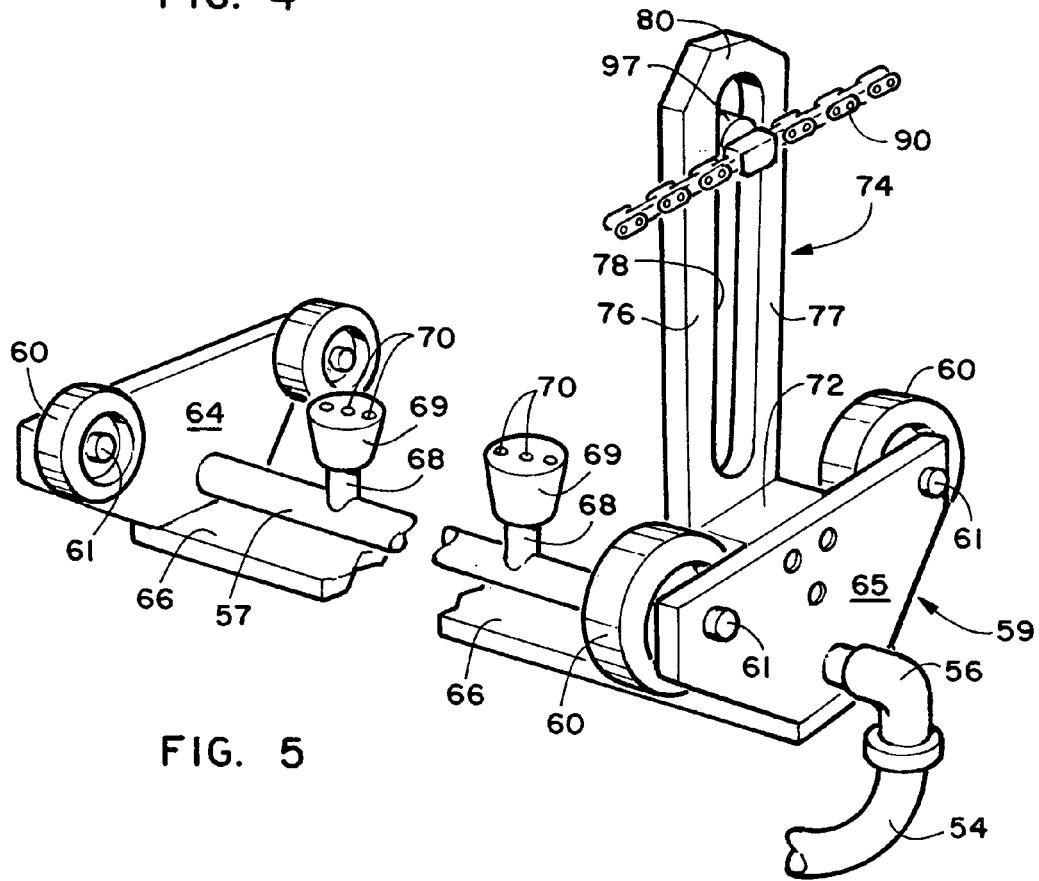
FIG. 5 is a front perspective view of the carriage that supports the spray nozzles.

The liquid/solids waste separator will now be described by referring to FIGS. 1–5 of the drawings. The liquid/solids waste separator is generally designated numeral 10. It has an elongated housing 12 having a front wall 13, a rear wall 14, an outer left side wall 15, an outer right side wall 16, a bottom wall 17 and a longitudinally extending X-axis.

An inner left side wall 19 and an inner right side wall 20 are laterally spaced and have their opposite ends secured to the respective front wall 13 and rear wall 14. A 200 mesh or larger stainless steel screen 22 has its lateral edges secured to the respective inner surfaces of side walls 19 and 20. This combined structure forms a flow channel for effluent having solid particles therein that would travel downwardly over the mesh screen.

Screen 22 has a length L1 and a width W1. L1 is in the range of 4–10 feet. W1 is in the range of 16–72 inches. Screen 22 is positioned a height H1 above bottom wall 17 and H1 is in the range of 5–16 inches. The waste separator has been designed to be tilted at an angle A and angle A is in the range of 25–60 degrees. The rear end of the housing 12 has a pair of laterally spaced support legs 24 attached to the respective left and right side walls 15 and 16. There are a plurality of apertures 25 longitudinally spaced along the top end of the respective legs so that the rear end of housing 12 can be attached thereto by bolts at various heights. A second pair of support legs 28 and cross members 29 support an overflow tank 31 having an outlet port 32 formed at its bottom end. In this embodiment a cap 33 can be used to close outlet port 32 of overflow tank 31. Effluent that has already been filtered through one or more separators is supplied through a pipe 33 and fills overflow tank 31. When the effluent reaches a predetermined height it travels along spreader box pan 36 and the affluent is deposited in the flow channel at the top end of screen 22.

Solid deposits that accumulate in the bottom of overflow tank 31 can be removed when cap 33 is removed. Alternatively, the effluent could be pumped through additional pipes upwardly through outlet port 32 into overflow tank 31. Spreader box pan 36 has a width less than screen 22 with upwardly extending lateral flanges along its lateral edges that cause the effluent to be laterally spread across the entire width of screen 22. As the effluent flows down the top surface of screen 22, the liquid portion passes through the apertures in screen 22. Solid waste particles either accumulate on top of the screen or partially enter the apertures of the screen. The liquid portion of the effluent passes downwardly into a collection chamber 40 in the bottom of housing 12. This liquid passes through an outlet port 42 into a reservoir tank 43. A T-pipe connection 45 is connected to pipes 46. 47 and 48. A pump 50 siphons off a portion of the liquid and draws it upwardly through fluid line 47 and pumps it upwardly through fluid line 52 and swivel elbow 53 into a hose 54. Hose 54 is connected by a swivel connector 56 to a tube 57 mounted on a carriage 59.

A pair of track members 62 are secured to the outer surface of respective inner left side wall 19 and inner right side wall 20. These tracks 62 extend most of the length of housing 12.

Carriage 59 has a pair of end plates 64 and 65 extending upwardly from a cross member 66. One end of tube 57 extends to end plate 64 and the other end of tube 57 passes through an aperture in end plate 65 and is connected to swivel connector 56. A plurality of pipes 68 extend upwardly from tube 57 and they have spray nozzles 69 connected at their top ends. These nozzles have apertures 70 that are arranged along a linear axis so that the spray produced is a knife-like blade of water shooting upwardly against the bottom surface of screen 22. The force of the spray will dislodge any particles that have been trapped in the apertures of screen 22. Cross member 66 and tube 57 pass beneath the bottom ends of the respective inner left side wall 19 and inner right side wall 20. Wheels 60 are mounted on axles 61 supported by the respective end plates 64 and 65. A block 72 is secured to the inner surface of end plate 65. A guide member 74 has its bottom end secured to block 72. Guide member 74 has a pair of legs 76 and 77 extending upwardly with a slot 78 therebetween. A connecting member 80 closes the top end of legs 76 and 77.

The drive system for moving carriage 59 reciprocally upwardly and downwardly along track 62 will now be described. A motor 82 is mounted on cover 83 and it has a drive shaft 84 extending downwardly that engages gear box 86. A shaft 87 exits gearbox 86 and it has a sprocket gear 88 mounted thereon. A chain 90 passes around sprocket gear 88 and a sprocket gear 92 located adjacent the bottom end of housing 12. Sprocket gear 92 is mounted on an idler shaft 94 that is supported by a pair of laterally spaced pillow block bearings 95. A drive peg 97 is firmly secured to chain 90 and it extends into or is captured within slot 78 of guide member 74. As sprocket gear 88 is rotationally driven, chain 90 will cause carriage 59 to travel upwardly along track 62 until it reaches sprocket gear 88. And as it travels around sprocket gear 88 drive peg 97 will travel downwardly in slot 78 and as the chain continues to travel it will cause carriage 59 to travel downwardly along tracks 62. This cycle operates continuously and on the upward travel of carriage 59 the particles in screen 22 are forced upwardly out of the apertures in the screen and on the return travel of carriage 59 downwardly the flow of water will cause the accumulated waste particles to travel downwardly along screen 22 and be deposited in a container 100 positioned at its bottom end.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended claims.

What is claimed:

1. A liquid/solids waste separator comprising:
    an elongated housing having a front wall, a rear wall, a left side wall, a right side wall, a bottom wall having a front end and a rear end, and a longitudinally extending X-axis;
    support means for supporting said housing with said rear end of said bottom wall positioned vertically higher than said front end of said bottom wall;
    an elongated mesh screen for separating solid waste particles from effluent while allowing the liquid portion of the effluent to pass downwardly through said mesh screen; said mesh screen having a top surface and a bottom surface, said mesh screen having a width W1 and a length L1; and apertures across said width and length;

means for supporting said elongated mesh screen in said housing at a predetermined height H1 above said bottom wall of said housing;

spray means positioned below said elongated mesh screen that directs a spray of liquid against said bottom surface of said mesh screen to unclog any apertures in said mesh screen that have become clogged;

means for connecting said spray means to a fluid source;

said spray means comprises a plurality of laterally spaced spray nozzles connected to a transversely extending tube having one end connected to said fluid source; a carriage is connected to each end of said tube and said carriage has a plurality of wheels; there is a track on each lateral side of said mesh screen that allows said spray nozzles to travel beneath most of the length of said mesh screen;

drive means for reciprocally driving said carriage back and forth beneath said mesh screen; said drive means comprises a motor that drives a chain passing around longitudinally spaced sprocket gears mounted in said housing; a drive peg extending laterally from said chain is captured by attachment means on said carriage; and said attachment means comprises a pair of vertically extending legs having their bottom ends rigidly connected to said carriage; said legs being longitudinally spaced to provide a vertical slot in which said drive peg is captured while allowing said drive peg to reciprocally travel up and down as said drive peg travels around said sprocket gears.

2. A liquid/solids waste separator as recited in claim 1 further comprising a removable cover attached on said housing.

3. A liquid/solids waste separator as recited in claim 1 wherein said housing is tilted at an angle A and A is in the range of 25–50 degrees.

4. A liquid/solids waste separator as recited in claim 1 wherein said mesh screen has a rectangular perimeter.

5. A liquid/solids waste separator as recited in claim 4 wherein W1 is in the range of 16–72 inches.

6. A liquid/solids waste separator as recited in claim 5 wherein L1 is in the range of 4–10 feet.

7. A liquid/solids waste separator as recited in claim 1 wherein said mesh screen is marketed as 200 mesh stainless steel.

8. A liquid/solids waste separator as recited in claim 1 wherein said bottom surface of said mesh screen is in communication with an area within said housing that forms a collection chamber for filtered liquid separated from the effluent.

9. A liquid/solids waste separator as recited in claim 8 wherein said means for connecting said spray means to a fluid source comprises a pump and fluid conduit connecting said fluid source to said spray means.

10. A liquid/solids waste separator as recited in claim 1 wherein said support means comprises a pair of support legs detachably secured to said housing.

11. A liquid/solids waste separator as recited in claim 1 further comprising an effluent overflow tank having structure for spreading the overflow of the effluent across the entire width of said mesh screen.

12. A liquid/solids waste separator as recited in claim 1 wherein said spray nozzles have apertures that produce a water knife spray across the width of said mesh screen.

13. A liquid/solids waste separator comprising:

an elongated housing having a front wall, a rear wall, a left side wall, a right side wall, a bottom wall having a front end and a rear end, and a longitudinally extending X-axis;

spaced inwardly from said left side wall is an upright oriented elongated inner left side wall having a front end, a rear end, a bottom edge, a top edge and an outer surface; said elongated inner left side wall extends parallel to said X-axis;

spaced inwardly from said right side wall is an upright oriented elongated inner right side wall having a front end, a rear end, a bottom edge, a top edge and an outer surface; said elongated inner right side wall extends parallel to said X-axis;

housing support means for supporting said housing with said rear end of said bottom wall positioned vertically higher than said front end of said bottom wall; said housing is tilted at an angle A;

said inner left side wall being laterally spaced a predetermined distance W1 from said inner right side wall;

an elongated mesh screen for separating solid waste particles from effluent while allowing the liquid portion of the fluid to pass downwardly through said mesh screen; said mesh screen having a top surface and a bottom surface; said mesh screen having a length L1;

mesh support means for supporting said elongated mesh screen in said housing at a predetermined height H1 above said bottom wall of said housing between said inner left side wall and said inner right side wall;

an elongated left side track having a longitudinal axis that extends parallel to said X-axis; said left side track having a top surface; means for supporting said left side track adjacent said outer surface of said inner left side wall;

an elongated right side track having a longitudinal axis that extends parallel to said X-axis; said right side track having a top surface; means for supporting said right side track adjacent said outer surface of said inner right side wall;

spray means positioned below said mesh screen that directs a spray of liquid against said bottom surface of said mesh screen to unclog any apertures in said mesh screen that have become clogged; said spray means having a plurality of laterally spaced spray nozzles connected to a transversely extending manifold tube having a left end and a right end;

a transversely extending carriage comprising a left end plate having an inner surface and a right end plate having an inner surface; a cross member has its opposite ends secured to said respective left and right end plates to form a rigid carriage; said manifold tube being supported between said left end plate and said right end plate; a left end tracking member resting on said top surface of said left side track; said left end tracking member being capable of reciprocal travel along said left side track; a right end tracking member resting on said top surface of said right side track; said right end tracking member being capable of reciprocal travel along said right side track; first attachment means for securing said left end tracking member to said left end plate; second attachment means for securing said right end tracking member to said right end plate; and drive means for reciprocally driving said carriage back and forth between said front end of said housing and said rear end of said housing with said spray nozzles beneath said mesh screen; said drive means comprises a motor that drives a chain passing around longitudinally spaced sprocket gears mounted in said housing; a drive peg extends laterally from said chain and is captured by a guide member extending upwardly from one end of said carriage.

14. A liquid/solids waste separator as recited in claim 13 wherein said housing is tilted at an angle A and A is in the range of 25–50 degrees.

15. A liquid/solids waste separator as recited in claim 13 wherein W1 is in the range of 16–72 inches.

16. A liquid/solids waste separator as recited in claim 13 wherein L1 is in the range of 4–10 feet.

17. A liquid/solids waste separator as recited in claim 13 wherein said bottom surface of said mesh screen is in communication with an area within said housing that forms a collection chamber for filtered liquid separated from the effluent.

18. A liquid/solids waste separator as recited in claim 13 further comprising an effluent overflow tank having structure for spreading the overflow of the effluent across the entire width of said mesh screen.

19. A liquid/solids waste separator as recited in claim 13 wherein said spray nozzles have apertures that produce a water knife spray across the width of said mesh screen.

* * * * *